Patented June 30, 1931

1,812,459

UNITED STATES PATENT OFFICE

KARL VIERLING, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

FERMENTATION OF TOBACCO

No Drawing. Application filed February 17, 1928, Serial No. 255,188, and in Germany February 24, 1927.

The present invention relates to the fermentation of tobacco.

In order to obtain a rapid and powerful fermentation of tobacco various methods have been adopted, as for example the addition of cultures of suitable bacteria or the spraying of the leaves to be fermented with nutritive solutions in order to strengthen the activity of the fermenting bacteria yet present on the leaves.

I have found that a special advantage in the fermentation and considerable improvements in the quality of the resulting tobacco are obtained by providing for a buffer mixture maintaining a hydrogen-ion concentration which is optimal for the life and the activity of the bacteria and if necessary also for nutritive material for the said microorganisms. The effect of the treatment of the tobacco-leaves with such solutions of buffer mixtures which are capable of providing for the optimal hydrogen-ion concentration in the beginning and maintaining it during the whole process of fermentation often allows of entirely dispensing with the addition of nutritive matter, such as urea or salts thereof or other suitable materials. The buffer solutions are preferably so chosen as to deliver a hydrogen-ion concentration of about from $pH=5$ to $pH=6$, which slightly acid range has been found most effective in fermenting the most different sorts of tobacco. Suitable buffer mixtures improving the fermentation are, for example, weak solutions of organic acids, such as citric or lactic acid containing inorganic salts of the aforesaid acids, such as the alkali metal or ammonium salts, or mixtures of inorganic acids, such as boric or phosphoric acid or salts thereof. The proportions of these ingredients of these mixtures are suitably chosen so as to maintain the aforesaid hydrogen-ion concentration. Usually spraying of the leaves to be fermented with the dilute solutions of the buffer mixtures is sufficient for producing a quick fermentation, by which a tobacco of excellent quality is obtained.

The nature of this invention is further illustrated by the following example but the invention is not restricted to the example. The parts are by weight.

Example

Dried leaves of tobacco are sprinkled with a solution of 9 parts of mono-potassium phosphate and 1 part of di-potassium phosphate in 100 parts of water. The sprinkled leaves are left for one day so that the solution is allowed to thoroughly penetrate the bundles of tobacco-leaves. Fermentation is then effected in the usual manner and its progress may be controlled with the aid of a thermometer.

What I claim is:

1. A process of fermenting tobacco which comprises treating tobacco-leaves with a solution of a buffer mixture capable of producing a hydrogen-ion concentration of about from $pH=5$ to $pH=6$ during the fermentation.

2. A process of fermenting tobacco which comprises spraying tobacco-leaves with a solution of 9 parts of mono-potassium phosphate and 1 part of di-potassium phosphate.

In testimony whereof I have hereunto set my hand.

KARL VIERLING.